United States Patent
Cui et al.

(10) Patent No.: US 10,462,782 B2
(45) Date of Patent: Oct. 29, 2019

(54) WIRELESS COMMUNICATION EQUIPMENT AND WIRELESS COMMUNICATION METHOD

(71) Applicant: Sony Corporation, Tokyo (JP)

(72) Inventors: Qimei Cui, Beijing (CN); Xiaofeng Tao, Beijing (CN); Xiang Zhou, Beijing (CN); Jiahui Liu, Beijing (CN); Ningyu Chen, Beijing (CN)

(73) Assignee: SONY CORPORATION, Tokyo (JP)

( * ) Notice: Subject to any disclaimer, the term of this patent is extended or adjusted under 35 U.S.C. 154(b) by 21 days.

(21) Appl. No.: 15/547,188

(22) PCT Filed: Nov. 6, 2015

(86) PCT No.: PCT/CN2015/093972
§ 371 (c)(1),
(2) Date: Jul. 28, 2017

(87) PCT Pub. No.: WO2016/150167
PCT Pub. Date: Sep. 29, 2016

(65) Prior Publication Data
US 2018/0020437 A1    Jan. 18, 2018

(30) Foreign Application Priority Data
Mar. 20, 2015   (CN) .......................... 2015 1 0124590

(51) Int. Cl.
*H04W 72/04*   (2009.01)
*H04W 24/02*   (2009.01)
(Continued)

(52) U.S. Cl.
CPC ......... *H04W 72/044* (2013.01); *H04L 5/0048* (2013.01); *H04W 16/14* (2013.01);
(Continued)

(58) Field of Classification Search
None
See application file for complete search history.

(56) References Cited

U.S. PATENT DOCUMENTS

2015/0023315  A1*  1/2015  Yerramalli .......... H04W 74/002
                                                              370/330

FOREIGN PATENT DOCUMENTS

| CN | 104301273 A   | 1/2015 |
|----|---------------|--------|
| CN | 104333873 A   | 2/2015 |
| WO | 2015/009433 A1 | 1/2015 |

OTHER PUBLICATIONS

International Search Report dated Feb. 15, 2016 in PCT/CN2015/093972 filed Nov. 6, 2015.

* cited by examiner

*Primary Examiner* — Kouroush Mohebbi
(74) *Attorney, Agent, or Firm* — Xsensus, LLP

(57) ABSTRACT

The present disclosure relates to wireless communication equipment and a wireless communication method. According to the wireless communication equipment for a base station side in an embodiment, the wireless communication equipment comprises one or multiple processors, and the one or multiple processors are configured to: determine to-be-transmitted communication content of a user equipment for a base station on a target unauthorized frequency band and estimate a transmission progress; and generate indicating information about the transmission progress, and add the indicating information into a communication frame of the user equipment for transmitting the indicating information.

16 Claims, 9 Drawing Sheets

(51) Int. Cl.
  *H04L 5/00* (2006.01)
  *H04W 16/14* (2009.01)
  *H04W 72/12* (2009.01)
  *H04W 88/02* (2009.01)
  *H04W 88/08* (2009.01)
  *H04W 72/00* (2009.01)
  *H04W 74/08* (2009.01)

(52) U.S. Cl.
  CPC ....... *H04W 24/02* (2013.01); *H04W 72/1289* (2013.01); *H04W 72/005* (2013.01); *H04W 72/0426* (2013.01); *H04W 72/0453* (2013.01); *H04W 74/0808* (2013.01); *H04W 88/02* (2013.01); *H04W 88/08* (2013.01)

WIRELESS COMMUNICATION EQUIPMENT AND WIRELESS COMMUNICATION METHOD

FIELD

The present disclosure relates to the field of wireless communication, and in particular to a wireless communication device for base station side, a wireless communication device for user equipment side and a wireless communication method.

BACKGROUND

Small cell is introduced in release 12 of Long Term Evolution (LTE). A small cell is a radio access node which has a low power, operates on licensed or unlicensed frequency spectrums, and may cover a range of 10 m to 200 m. An LTE network deployed in a licensed frequency band may be deployed widely all over the world. In order to further increase a capacity of the LTE network so as to meet a highly increasing requirement of data, a radio interface and a transmission mechanism of the LTE may be adjusted such that data can be transmitted by using the unlicensed frequency spectrum resource. The technology is referred to as Licensed Assisted Access (LAA)-LTE.

From the perspective of a user, the user may obtain a better quality of service by efficiently using the unlicensed frequency spectrum resource. Improvement of user experience and transparent transmission for the unlicensed frequency band may provide more flexibility for an operator and may also enable the operator to obtain higher gains by developing and using the unlicensed frequency band. Accordingly, this will promote the operator to develop the unlicensed frequency spectrum more.

In order to use an unlicensed frequency band of, e.g., 5 GHz as a target frequency band, some additional standards need to be established to meet different requirements for different regions. In order to carry out a semi-static detection and reduce interference on a non-International Mobile Telecommunication (IMT) system such as a radar system, a dynamic frequency selection (DFS) mechanism is widely used in some regions. Listen Before Talk (LBT) provides a flexible and fair coexistence mechanism for different IMT and non-IMT systems. LBT can ensure rapid channel detection and dynamic channel occupation for the unlicensed frequency band. Although not being used widely, Transmission Power Control (TPC) technology is a method for limiting power leakage for an adjacent cell.

SUMMARY

Brief summary of embodiments of the present disclosure is given hereinafter, to provide basic understanding for certain aspects of the present disclosure. It should be understood that, the summary is not exhaustive summary of the present disclosure. The summary is not intended to determine key parts or important parts of the present disclosure, and is not intended to limit the scope of the present disclosure. An object of the summary is only to give some concepts of the present disclosure in a simplified form, as preamble of the detailed description later.

According to an embodiment, a wireless communication device for base station side is provided, which includes at least one processor configured to: determine communication traffic to be transmitted to a user equipment of the base station on a target unlicensed frequency band and estimate a transmission schedule; and generate indication information on the transmission schedule and add the indication information into a communication frame for the user equipment to transmit the indication information.

According to another embodiment, a wireless communication method is provided, which includes: a step of determining communication traffic to be transmitted to a user equipment of the base station on a target unlicensed frequency band and estimating a transmission schedule; and a step of generating indication information on the transmission schedule and adding the indication information into a communication frame for the user equipment to transmit the indication information.

According to yet another embodiment, a wireless communication device for user equipment side is provided, which includes at least one processor configured to: detect an unlicensed frequency band; parse indication information on a transmission schedule of communication traffic to be transmitted on the unlicensed frequency band included in a communication frame of a base station; and generate feedback information on a serving base station of the user equipment based on a detection result on the unlicensed frequency band.

According to still another embodiment, a wireless communication method performed on user equipment side is provided, which includes: a step of detecting an unlicensed frequency band; a step of parsing indication information on a transmission schedule of communication traffic to be transmitted on the unlicensed frequency band included in a communication frame of a base station; and a step of generating feedback information on a serving base station of the user equipment based on a detection result on the unlicensed frequency band.

According to yet another embodiment, a wireless communication device for base station side is provided, which includes at least one processor configured to: detect availability of an unlicensed frequency band; preliminarily allocate a corresponding unlicensed frequency band for a user equipment of the base station based on the availability of the unlicensed frequency band; and generate an occupation signal for the corresponding unlicensed frequency band so as to indicate within a specific period that the base station intends to access the corresponding unlicensed frequency band, wherein the occupation signal includes a pilot sequence corresponding to a cell of the base station and does not include data information.

BRIEF DESCRIPTION OF THE DRAWINGS

The present disclosure may be understood better with reference to the description given in conjunction with drawings hereinafter. The same or similar reference numerals are used to indicate the same or similar components throughout all the drawings. The drawings together with the following detailed description are included in the specification, form a part of the specification, and are used to further illustrate preferred embodiments of the present disclosure and explain principles and advantages of the present disclosure by examples. In the drawings.

DETAILED DESCRIPTION OF EMBODIMENTS

Figure 1:
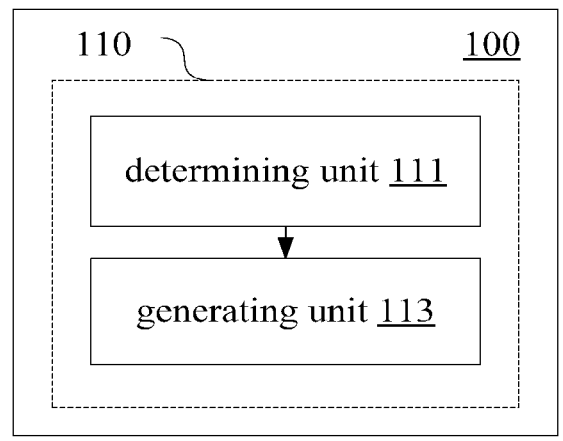
FIG. 1 is a block diagram showing a configuration example of a wireless communication device for base station side according to an embodiment of the present disclosure.

Hereinafter, embodiments of the present disclosure are described with reference to the drawings. Elements and features described in one drawing or one embodiment of the present disclosure may be combined with elements and features described in one or more other drawings or embodiments. It should be noted that, indication and description of components and processing which are not related to the present disclosure or well known for those skilled in the art are omitted in the drawings and illustrations for clearness.

As shown in FIG. 1, a wireless communication device 100 according to an embodiment includes a processor 110. It should be noted that, although a determining unit 111 and a generating unit 113 in the processor 110 are shown as functional modules in FIG. 1, it should be understood that functions of the determining unit 111 and the generating unit 113 may be implemented by the processor 110 integrally, and is not necessarily implemented by discrete actual components in the processor 110. In addition, although the processor 110 is shown as a dashed line box in FIG. 1, the communication device 100 may include multiple processors, and the functions of the determining unit 111 and the generating unit 113 may be performed by multiple processors in cooperation.

The determining unit 111 is configured to determine communication traffic to be transmitted to a user equipment of a base station on a target unlicensed frequency band and estimate a transmission schedule.

It should be noted that, in some examples, data is transmitted only by a Licensed Assisted Access (LAA) frequency band, and communication traffic to be transmitted is pure data. In some other examples, in addition to data, signaling information may also be transmitted by the LAA frequency band. Here, the LAA frequency band and a licensed frequency band are generally used jointly by carrier aggregation. As an example in which an unlicensed frequency band is applied in a cellular communication system, unlicensed frequency band resources may be used in a stand-alone manner in some examples, and the present disclosure is not intended to be limited to any manner.

In addition, the transmission schedule may be remaining time for transmitting the communication traffic. For example, the remaining time for transmitting may be estimated by calculating a size of the transmitted data and a current transmission rate. However, the present disclosure is not limited thereto. For example, the transmission schedule may be indicated by the remaining amount of data to be transmitted. For another example, in a case that the user equipment is restricted to transmit on the unlicensed frequency band within a predetermined time length, the transmission schedule may also be indicated by the duration of a transmission that has been performed.

The generating unit 113 generates indication information on the transmission schedule and adds the indication information into a communication frame of the user equipment, to transmit the indication information.

According to an embodiment, the generated indication information may be included in a broadcast subframe, for coordination with other communication devices. Specifically, the broadcast subframe may be a common channel subframe. Accordingly, the generating unit 113 may also include information on a physical cell identifier (PCI) of a base station in the common channel subframe, for coordination with other communication devices. For example, a synchronization signal is transmitted in the common channel subframe to indicate the PCI implicitly. In a preferred example, the wireless communication device 100 may add the indication information into a communication frame containing the communication traffic to be transmitted, so as to transmit the indication information on the target unlicensed frequency band, thereby reducing complexity for detecting a transmission schedule/idle time for the target unlicensed frequency band by other device. Optionally, the indication information may also be added into a broadcast subframe on a licensed frequency band and is not transmitted together with the communication traffic to be transmitted. An ID of an unlicensed frequency band corresponding to the indication information need to be included in the broadcast subframe.

According to a discussion result of the 78-th conference of the third Generation Partnership Project (3GPP) RAN1, for an LTE user, non-continuous transmission within a limited maximum transmission time period needs to be followed on an unlicensed frequency band carrier. According to an embodiment of the present disclosure, when the base station performs transmission on the unlicensed frequency band, for example, the base station may periodically add a signal in the transmitted data for indicating remaining time of transmission, so as to indicate a transmission schedule such as remaining time for transmission of a current frequency band to other operators, for example. Therefore, a signal for indicating transmission on the unlicensed frequency band may be transmitted in a broadcast subframe, such that base stations and users for different operators can detect the information, so as to achieve coordination/coexistence of different operators on usage of the unlicensed frequency band. For example, an LTE communication system of a second operator may determine remaining available transmission time within the current limited maximum transmission time period and prepare for transmission, based on a transmission schedule of an LTE communication system of a first operator on the unlicensed frequency band.

According to a specific embodiment, the broadcast subframe is a multicast broadcast single frequency network (MBSFN) subframe.

Multimedia broadcast multicast service (MBMS) supports multicast and broadcast services in a cellular system, thereby providing multicast, broadcast and unicast services in one network. For the LTE, the transmission is referred to as MBMS single frequency network (MBSFN). In the conventional MBSFN transmission, multiple cells performing MBSFN transmission transmit identical information on a designated MB SFN subframe. For a user equipment, signals from the multiple cells have exactly the same waveform, and it may be regarded as receiving a single signal from a single cell by multipath transmission. Therefore, the following benefits are achieved:

a strength of the received signal is increased, and a terminal may use signal energy received from multiple cells, particularly at a boundary between cells participating a MBSFN transmission;

an interference level is reduced, and a signal received from an adjacent cell is not an interference signal but a useful signal, particularly at the boundary between cells participating a MBSFN transmission; and an additional diversity for resisting wireless channel fading is generated; since information is received from several positions which are separated geographically, thereby resulting in that a overall composite channel presents a strong time distribution, or in other words, a strong frequency selectivity.

In the present disclosure, the inventor subverts the knowledge for the conventional MBSFN transmission. In MBSFN transmission performed by multiple cells, it is not required that multiple cells transmit identical information, and it is also not required that the user equipment combines MBSFN transmission traffic from multiple cells. Instead, respective cells carry corresponding transmission schedule information on the unlicensed frequency band by using MBSFN subframes. In this way, in the LTE communication system, the user equipment or the base station may easily read MBSFN transmission traffic from multiple cells (for example, the cells are managed by different operators) on a specific transmission resource (for example, uniformly preset frequency points and subframes), and determine transmission schedules for the unlicensed frequency band of respective cells based on a decoding result on the MBSFN subframe. During this process, interaction between cells is not required and no new subframe structure is to be designed, such that it is easy and feasible to coordinate usage of the unlicensed frequency spectrum by different operators.

Next, an example of indicating the transmission schedule by MBSFN is illustrated in a manner that remaining time for transmitting communication traffic estimated by the base station functions as the transmission schedule.

It is assumed that the transmission time estimated by the base station is ten frames and four frames have already been transmitted, the base station may transmit one indication signal every two frames, for example, to indicate its required remaining transmission time. For example, when other base station or user detects a sequence "11" in the MBSFN, the base station or user may know that there are three remaining MB SFN subframes in the frequency band, that is, a base station performing transmission currently still has six frames to be transmitted. Other base stations may determine whether to access after waiting till the completion of the transmission for the current frequency band, by using the information. In addition, PCI information on the base station may also be added into the MBSFN to assist the UE to identify which cell the received MBSFN subframe is from. The interval for transmitting the indication signal by the base station may be set as different values according to different limited maximum transmission time. For example, when a limited maximum transmission duration is less than 30 ms, it may be set that one indication signal is transmitted in each frame.

In addition, the UE may learn the PCI of a base station of the same operator from system information on the cell, such as a white list in the SIB information. If the PCI detected by the user is not on the white list, the UE may determine that the PCI belongs to another operator. If the detected PCI is on the white list, it may be determined that the signal is from an adjacent same operator. In this way, the UE may feedback a corresponding detection result to a serving base station, for the base station to determine a coexistence strategy on the unlicensed frequency band.

Figure 2:
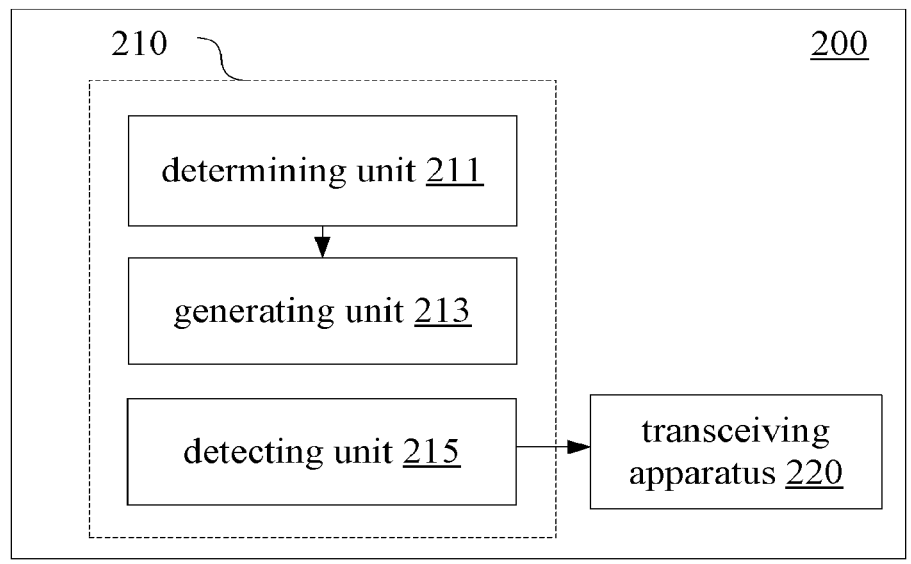
FIG. 2 is a block diagram showing a configuration example of a wireless communication device for base station side according to another embodiment of the present disclosure.

Next, a wireless communication device for base station side according to another embodiment is illustrated with reference to FIG. 2. As shown in FIG. 2, a wireless communication device 200 according to the embodiment includes a processor 210. The processor includes a determining unit 211, a generating unit 213 and a detecting unit 215. The determining unit 211 and the generating unit 213 are similar to the determining unit 111 and the generating unit 113 described above with reference to FIG. 1.

The detecting unit 215 is configured to detect an unlicensed frequency band, estimate an available unlicensed frequency band based on a detection result and select at least one candidate frequency band for a user equipment.

The wireless communication device 200 according to the embodiment further includes a transceiving apparatus 220 configured to notify the user equipment of the selected at least one candidate frequency band.

The detecting unit 215 may detect the unlicensed frequency band by controlling the transceiving apparatus 220.

Next, the embodiment is illustrated by specific examples. It should be understood that the present disclosure is not limited by details in the following specific examples.

Taking an unlicensed frequency band of 5470 MHz to 5725 MHz as an example, the frequency band may be occupied by a radar system or a Wi-Fi user. The wireless communication device may detect, for example, the whole unlicensed frequency band and generate an information list including available unlicensed frequency bands based on a detection result, for example, the following table 1.

TABLE 1

| | idle channel list |
|---|---|
| number | available channel width (MHz) |
| 1 | 5480-5485 |
| 2 | 5500-5520 |
| 3 | 5570-5585 |
| ... | ... |
| n | 5710-5720 |

After the list is generated, the base station may transmit the obtained available frequency band information to users which need to transmit data on the unlicensed frequency band. Specifically, the base station may allocate available frequency bands based on different data transmission requirements of the users. For example, a user with a greater data transmission requirement may have priority in obtaining a wider unlicensed frequency band resource.

In addition, according to an embodiment, after receiving frequency band information from a base station, the user equipment itself may also detect the specific frequency band to reduce possible interference on the current system. After detecting the corresponding frequency band information, the user transmits feedback information to the base station.

Generally, a delay of a feedback mechanism of the user equipment is about 4 ms, and access time of other systems such as a WiFi system may be shorter than 4 ms. Therefore, in the time period during which the user performs feedback, the WiFi device may also detect the frequency band and determine that the frequency band is available currently, so the WiFi device may access the frequency band within 4 ms. In this case, it will result in that an LTE base station cannot occupy the frequency band or the base station also accesses the frequency band and resulting in a conflict between the two systems.

In view of the above problem, according to an embodiment, the transceiving apparatus 220 is configured to transmit an occupation signal on a candidate frequency band within a predetermined time period after notifying the user equipment of the candidate frequency band. For example, the occupation signal may be a beacon signal.

Accordingly, in an embodiment of the present disclosure, a wireless communication device for base station side includes at least one processor. The processor may include a detecting unit, an allocating unit and a generating unit. The detecting unit is configured to detect availability of an unlicensed frequency band. The allocating unit is configured to preliminarily allocate a corresponding unlicensed frequency band for a user equipment of a base station based on the availability of the unlicensed frequency band. The generating unit is configured to generate an occupation signal for the corresponding unlicensed frequency band, to indicate, within a specific time period, that the base station intends to access the corresponding unlicensed frequency band, wherein the occupation signal includes a pilot sequence corresponding to a cell of the base station and does not include data information. In addition, the wireless communication device according to the embodiment may further include a transceiving apparatus which may detect the unlicensed frequency band and transmit the pilot sequence generated by the processor under control of the processor, for example.

Next, the embodiment is illustrated by specific examples. It should be understood that the present disclosure is not limited to details in the following specific examples.

Figure 14:
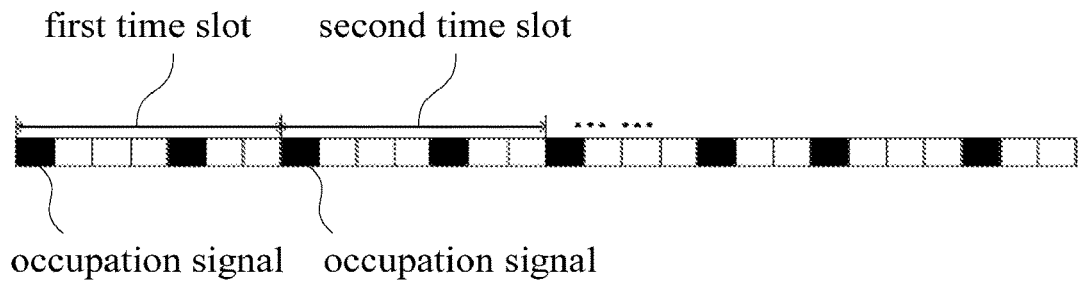
FIG. 14 is a schematic diagram of an occupation signal according to an embodiment of the present disclosure.

When the base station detects an idle frequency band in the unlicensed frequency band and allocate the same to a user, the base station may transmit an occupation signal periodically on the frequency band to prevent other devices from accessing the frequency band in a period during which the user performs feedback. The occupation signal may be designed as a cell specific reference signal (CRS), for example. In the time domain, there are two CRS signals in one LTE time slot, which means that a maximum time interval of the CRS signal is three OFDM symbols, about 200 μs. As shown in FIG. 14, the base station may transmit an occupation signal until feedback information from the user is received.

By transmitting the occupation signal in the feedback time period, for example a WiFi device can be prevented from accessing the frequency band to a significant extent, thereby improving an accessing probability of the LTE on the unlicensed frequency band.

As described above, according to an embodiment, the user equipment may also detect a specific frequency band and transmit feedback information to the base station. Next, the embodiment is illustrated with reference to FIG. 3.

Figure 3:
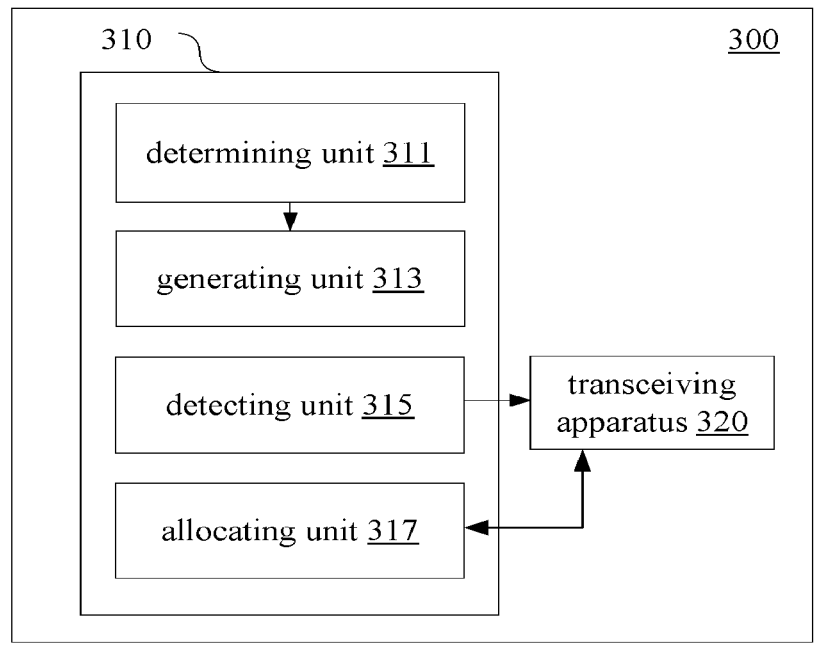
FIG. 3 is a block diagram showing a configuration example of a wireless communication device for base station side according to yet another embodiment of the present disclosure.

As shown in FIG. 3, a wireless communication device 300 according to the embodiment includes a processor 310 and a transceiving apparatus 320. The processor includes a determining unit 311, a generating unit 313, a detecting unit 315 and an allocating unit 317. The determining unit 311, the generating unit 313 and the detecting unit 315 are similar to the determining unit 111 and the generating unit 113 illustrated with reference to FIG. 1 and the detecting unit 215 illustrated with reference to FIG. 2.

The transceiving apparatus 320 is configured to receive a detection result on a candidate frequency band from a user equipment. The allocating unit 317 is configured to determine a target unlicensed frequency band to be allocated to the user equipment based on the detection result on the candidate frequency band from the user equipment. In other words, according to the embodiment, the allocation of the unlicensed frequency band may be determined based on feedback information from the user equipment. Alternatively, the allocation of the unlicensed frequency band may be determined based on both a detection result on the unlicensed frequency band from the base station and the feedback information from the user equipment.

In a case that the allocation of the unlicensed frequency band is determined based on both the detection result on the unlicensed frequency band from the base station and the feedback information from the user equipment, the detecting unit 315 may be configured to detect a candidate frequency band again after obtaining the detection result on the candidate frequency band from the user equipment, and the allocating unit 317 may determine a target unlicensed frequency band to be allocated to the user equipment based on the detection result on the candidate frequency band from the user equipment and a result detected again by the detecting unit 315.

Next, the embodiment is illustrated by specific examples. It should be understood that the present disclosure is not limited by details in the following specific examples.

For example, the user equipment may indicate a detection result on the target unlicensed frequency band by a sequence of 2 bits as follow:
  00: no signal transmission is detected
  01: there is LTE signal transmission from a same operator
  10: there is LTE signal transmission from a different operator 11: there is an unknown signal transmission from another system In a case that the base station transmits an occupation signal after allocating a frequency band for the user equipment, the user equipment will detect the occupation signal transmitted by the base station when detecting a channel. For the user equipment, if only the occupation signal transmitted by the base station is detected, it can be considered that the frequency band is available, and 00 is fed back.

For the base station and the user equipment, if a signal such as a CRS signal transmitted by another base station is detected at an initial detection, it can be directly determined that the frequency band is not available (this case occurs with a low probability, since the base station only transmits a CRS signal within a feedback time period of about 4 ms and then selects to access, abandon or wait, so simply abandoning accessing in such a case does not significantly influence an access probability for the unlicensed frequency band).

In addition, the base station may allocate two or more target unlicensed frequency bands for one user equipment simultaneously. In this case, the user equipment may detect the frequency bands and obtain corresponding feedback information. A specific detection manner is similar to that in a case of a single frequency band. After obtaining feedback results on the two frequency bands from the user, the base station determines whether all or a part of the allocated frequency bands are available jointly based on a detection result obtained by the base station itself.

When the base station allocates two or more unlicensed frequency bands for a certain user, in order to better distinguish different frequency bands, the base station may number the channels, as shown by the following table 2 for example.

TABLE 2 numbering of multiple frequency bands for a single user

| allocated frequency band | number |
| --- | --- |
| 5480-5485 | 1 |
| 5500-5520 | 2 |
| ... | ... |
| 5710-5720 | n |

When the base station allocates n channels for a certain user equipment, the user equipment detects all the n channels after receiving the allocated channels and feeds back detection results on the n channels to the base station after detecting all the channels, for example, channel 1:"00"; channel 2:"01"; . . . channel n:"11". The base station may independently determine whether each channel is available based on the feedback results and the detection results obtained by the base station itself.

Similar to the examples described above, detection results on the frequency bands from the user equipment and the base station may be indicated by an information sequence of two bits respectively, as shown in the following table 3, for example.

TABLE 3 joint detection results

| eNB | UE | | | |
| --- | --- | --- | --- | --- |
| | 00 | 01 | 10 | 11 |
| 00 | 0000 | 0001 | 0010 | 0011 |
| 01 | 0100 | 0101 | 0110 | 0111 |
| 10 | 1000 | 1001 | 1010 | 1011 |
| 11 | 1100 | 1101 | 1110 | 1111 |

According to specific applications and requirements, the base station may determine allocation of the target unlicensed frequency band from a combination of the detection results based on different rules.

For example, the frequency band may be allocated in a case that neither of the base station and the user equipment detects that another base station or device uses the target unlicensed frequency band.

Alternatively, in a case that it is detected that only another base station of the same operator as the present base station is using the target unlicensed frequency band, the frequency band may be allocated. In this case, the base station may coordinate the usage of the target frequency band with the other base station, which will be illustrated in combination with specific embodiments later.

In addition, according to an embodiment, in a case that a signal from another base station includes information indicating a transmission schedule, available time for a corresponding unlicensed frequency band may be estimated based on the indication information, so that a corresponding frequency band is used or detected at corresponding time.

Figure 4:
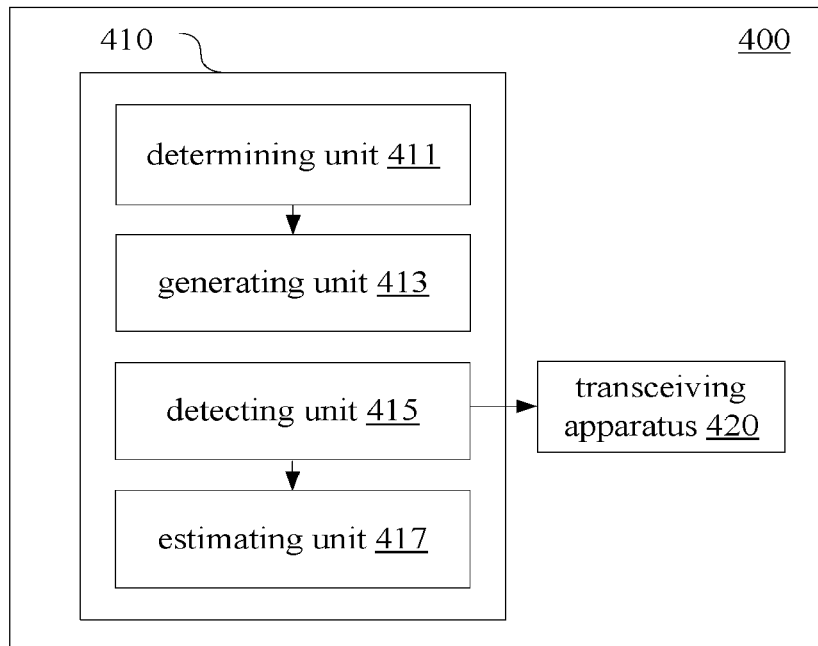
FIG. 4 is a block diagram showing a configuration example of a wireless communication device for base station side according to another embodiment of the present disclosure.

As shown in FIG. 4, a wireless communication device 400 according to an embodiment of the present disclosure includes a processor 410 and a transceiving apparatus 420. The processor 410 includes a determining unit 411, a generating unit 413, a detecting unit 415 and an estimating unit 417. The determining unit 411, the generating unit 413 and the detecting unit 415 are similar to the determining unit 111 and the generating unit 113 illustrated with reference to FIG. 1 and the detecting unit 215 illustrated with reference to FIG. 2. The transceiving apparatus 420 is similar to the transceiving apparatus 220 illustrated with reference to FIG. 2.

The estimating unit 417 is configured to estimate available time for a corresponding unlicensed frequency band based on indication information on a transmission schedule in a detected signal from another base station.

Next, an embodiment in which the usage of a target frequency band is coordinated with another base station is illustrated with reference to FIG. 5.

Figure 5:
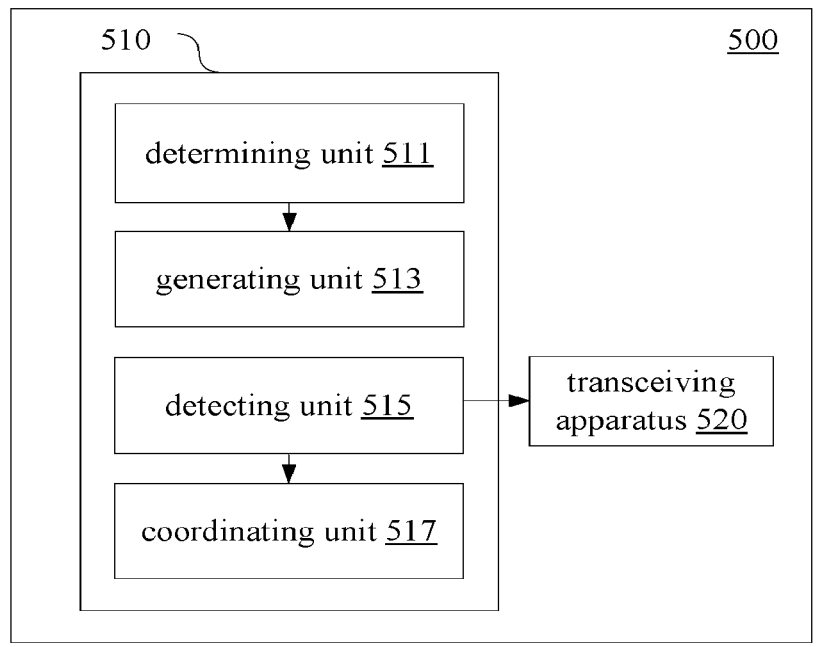
FIG. 5 is a block diagram showing a configuration example of a wireless communication device for base station side according to yet another embodiment of the present disclosure.

As shown in FIG. 5, a wireless communication device 500 according to the embodiment includes a processor 510 and a transceiving apparatus 520. The processor 510 includes a determining unit 511, a generating unit 513, a detecting unit 515 and a coordinating unit 517. The determining unit 511, the generating unit 513 and the detecting unit 515 are similar to the determining unit 111 and the generating unit 113 illustrated with reference to FIG. 1 and the detecting unit 215 illustrated with reference to FIG. 2. The transceiving apparatus 520 is similar to the transceiving apparatus 220 illustrated with reference to FIG. 2.

The coordinating unit 517 is configured to coordinate the usage of the unlicensed frequency band with another base station in a case that a signal from the other base station, belonging to the same system, in the unlicensed frequency band is detected. It should be noted that, the other base station belonging to the same system here refers to another base station belonging to the same operator of the LTE system.

Next, a process in which the usage of an unlicensed frequency band is coordinated with another base station is illustrated by a specific example. In the example, coordination with the other base station is performed based on detection results on the unlicensed frequency band from the base station and the user equipment. However, the present disclosure is not limited thereto. Coordination may also be performed based only on the detection result from the base station or the detection result from the user equipment.

When the base station or the user equipment detects that there is an LTE signal from the same operator on the target frequency band, the base station may coordinate with the other accessed base station by an X2 interface for example. For the existing LTE standard, some X2 messages related to inter-cell interference coordination (ICIC), such as a high interference indication (HII) message and an overload indication (OI) message, have been defined. HII may be regarded as an active means for ICIC, so as to avoid a case of a too low signal to interference plus noise power ratio. OI is a passive means for ICIC, which indicates an interference level subjected to by a cell on different resource blocks by three levels (low, medium and high). An adjacent base station receiving the OI may change its scheduling behavior to change the interfering situation of a base station transmitting the OI.

When the base station or user equipment detects that a base station of another operator occupies a target frequency band, remaining transmission time may be determined by detecting indication information in the MBSFN for example. The base station may detect the target frequency band again after waiting for corresponding time. In addition, if it is detected that a base station of a different operator is using the target frequency band, the base station may also detect the target frequency band again after waiting for corresponding time based on the indication information.

In a case where both the base station and the user equipment detect that the base station of a different operator is using the target frequency band: if the base station and the user equipment detect information from the same base station, access can be made after the base station completes the transmission; if the detected information is from different base stations, which indicates that two different base stations are performing transmission on the frequency band, the base station may reselect a new target frequency band, or the base station may use the target frequency band after both the accessed base stations complete transmissions.

It should be understood that the present disclosure is not limited by details in the above examples.

According to an embodiment, the coordinating unit 517 may identify another base station of a same system based on a physical cell identifier (PCI) or a synchronization signal (SS) in a signal from the other base station. The synchronization signal includes for example a primary synchronization signal (PSS) and a secondary synchronization signal (SSS) which may be used to calculate the PCI.

Next, a wireless communication device according to another embodiment is illustrated with reference to FIG. 6.

Figure 6:
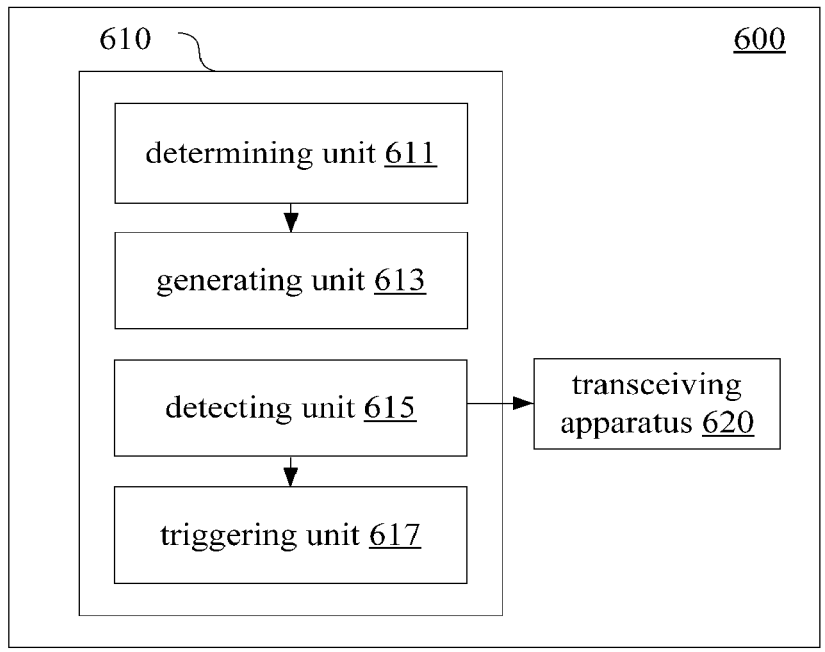
FIG. 6 is a block diagram showing a configuration example of a wireless communication device for base station side according to another embodiment of the present disclosure.

As shown in FIG. 6, a wireless communication device 600 according to the embodiment includes a processor 610 and a transceiving apparatus 620. The processor 610 includes a determining unit 611, a generating unit 613, a detecting unit 615 and a triggering unit 617. The determining unit 611, the generating unit 613 and the detecting unit 615 are similar to the determining unit 111 and the generating unit 113 illustrated with reference to FIG. 1 and the detecting unit 215 illustrated with reference to FIG. 2. The transceiving apparatus 620 is similar to the transceiving apparatus 220 illustrated with reference to FIG. 2.

The triggering unit 617 is configured to trigger a detection on an unlicensed frequency band based on a request from a user equipment and/or a quality of communication with the user equipment by using a licensed frequency band. That is, the wireless communication device according to the embodiment may trigger detection on the unlicensed frequency band based on a predetermined condition, which may be a request from a user equipment or may be that the quality of communication using the licensed frequency band is lower than a predetermined standard and thus an unlicensed frequency band needs to be used.

In a case that a detection is triggered based on a user request, for example, in a case that the user equipment finds out that a transmission rate of the licensed frequency band is lower than a predetermined level, the user equipment may transmit a request for accessing the unlicensed frequency band to a base station. In addition, the user equipment may also detect the unlicensed frequency band, for example, generate a frequency band information list and transmit the list to the base station by a physical uplink control channel (PUCCH). The base station may compare the list provided by the user equipment with the list of the base station, select an idle unlicensed frequency band detected by both the user equipment and the base station, and allocate the frequency band.

In describing the wireless communication device in the above embodiments, some processing or methods are also disclosed apparently. In the following, summary of a wireless communication method according to an embodiment of the present disclosure is given without repeating some details discussed above.

Figure 7:
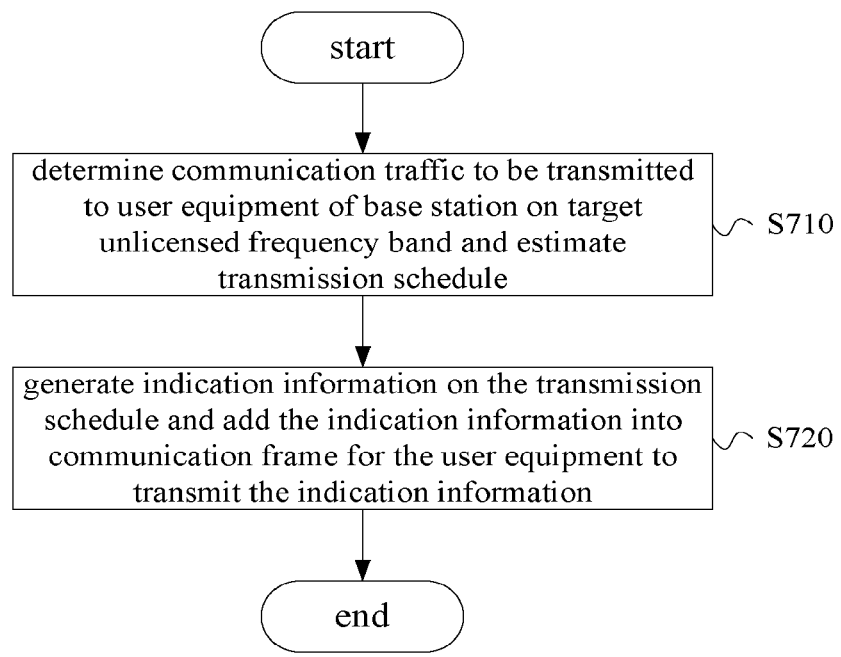
FIG. 7 a flowchart showing a process example of a wireless communication method performed on base station side according to an embodiment of the present disclosure.

As shown in FIG. 7, a wireless communication method performed on base station side according to the embodiment includes:

Step S710, determining communication traffic to be transmitted to a user equipment of a base station on a target unlicensed frequency band and estimating a transmission schedule; and Step S720, generating indication information on the transmission schedule and adding the indication information into a communication frame for the user equipment to transmit the indication information. Preferably, the indication information may be added into a communication frame including the traffic to be transmitted so as to be transmitted on the target unlicensed frequency band, thereby reducing complexity for detecting the transmission schedule/idle time for the target unlicensed frequency band by another device. Optionally, the indication information may be added into a broadcast subframe on a licensed frequency band and is not transmitted together with the traffic to be transmitted. The broadcast subframe needs to include an ID of an unlicensed frequency band corresponding to the indication information.

As described above, according to a specific embodiment, the indication information is included in a broadcast subframe for coordinating with another communication device. The broadcast subframe is an MBSFN subframe for example.

The wireless communication device and the wireless communication method for base station side according to the embodiments of the present disclosure are illustrated above. In addition, embodiments of the present disclosure also include a wireless communication device and a wireless communication method for user equipment side. Next, a summary of the wireless communication device and the wireless communication method for user equipment side is given without repeating some details discussed above.

Figure 8:
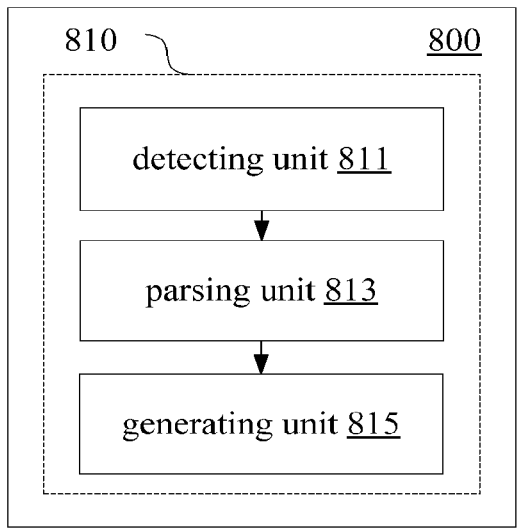
FIG. 8 is a block diagram of a configuration example of a wireless communication device for user equipment side according to an embodiment of the present disclosure.

As shown in FIG. 8, a wireless communication device 800 for user equipment side according to an embodiment includes at least one processor 810. The processor 810 includes a detecting unit 811, a parsing unit 813 and a generating unit 815. It should be noted that, the detecting unit 811, the parsing unit 813 and the generating unit 815 indicate functions which may be achieved by the processor 810, and are not necessarily actual components of the processor 810. In addition, although the processor 810 is shown by a dashed line box in FIG. 8, the communication device 800 may include multiple processors which may cooperate to achieve the functions of the detecting unit 811, the parsing unit 813 and the generating unit 815.

The detecting unit 811 is configured to detect an unlicensed frequency band. Here, the detection on the unlicensed frequency band may be performed by controlling another component such as a transceiving apparatus. A specific configuration of the detecting unit 811 may be similar to that of the detecting unit 215 illustrated above with reference to FIG. 2.

The parsing unit 813 is configured to parse indication information on a transmission schedule of communication traffic to be transmitted on the unlicensed frequency band included a communication frame of a base station. The communication frame may be located in the unlicensed frequency band and may carry the communication traffic to be transmitted. Alternatively, the communication frame may be located in a licensed frequency band. In addition, the indication information is included in a periodical broadcast subframe, for example.

The generating unit 815 is configured to generate feedback information for a serving base station of the user equipment based on a detection result on the unlicensed frequency band.

According to an embodiment, the detecting unit 811 is configured to detect at least one candidate frequency band in an unlicensed frequency band designated by the serving base station, and the generating unit 815 generates corresponding feedback information.

According to an embodiment, the parsing unit 813 is configured to detect a multicast broadcast single frequency network subframe included in the communication frame to parse the indication information.

Specifically, the multicast broadcast single frequency network subframe may include a physical cell identifier of a base station transmitting the indication information. The parsing unit 813 is configured to parse the physical cell identifier. The generating unit 815 determines an operator to which a base station that currently occupying the unlicensed frequency band for transmission belongs based on the physical cell identifier and generates corresponding feedback information.

Figure 9:
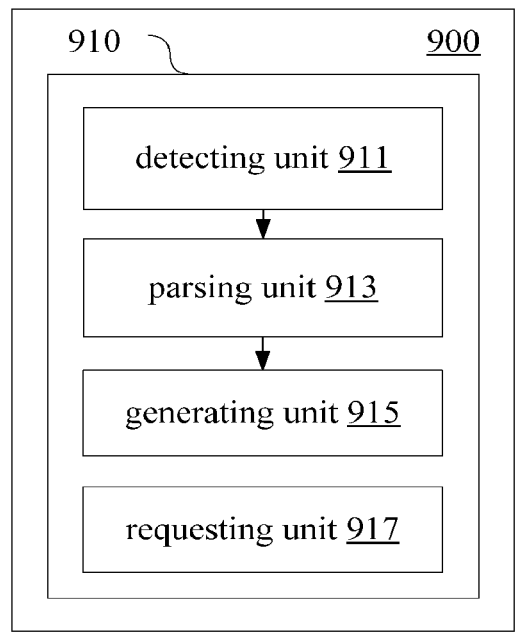
FIG. 9 is a block diagram showing a configuration example of a wireless communication device for user equipment side according to another embodiment of the present disclosure.

As mentioned above, the user equipment may request the base station to detect and allocate the unlicensed frequency band based on a predetermined condition. As shown in FIG. 9, a wireless communication device 900 for user equipment side according to an embodiment includes a processor 910 which includes a detecting unit 911, a parsing unit 913, a generating unit 915 and a requesting unit 917. Configurations of the detecting unit 911, the parsing unit 913 and the generating unit 915 are similar to configurations of the detecting unit 811, the parsing unit 813 and the generating unit 815 illustrated above with reference to FIG. 8.

The requesting unit 917 is configured to generate a request for an unlicensed frequency band in a case that a quality of communication performed with a serving base station of the wireless communication device 900 by using a licensed frequency band is lower than a predetermined level, so as to trigger a detection and allocation process on the unlicensed frequency band.

The requesting unit 917 may transmit the request by schedule request (SR) signaling, for example.

Figure 10:
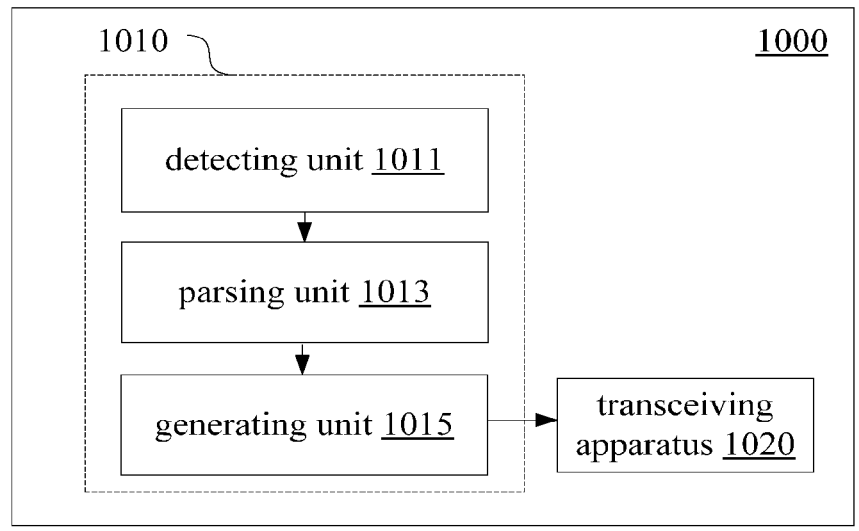
FIG. 10 is a block diagram showing a configuration example of a wireless communication device for user equipment side according to yet another embodiment of the present disclosure.

Next, a wireless communication device for user equipment side according to another embodiment is illustrated with reference to FIG. 10. As shown in FIG. 10. a wireless communication device 1000 according to the embodiment includes at least one processor 1010 and a transceiving apparatus 1020. The processor 1010 includes a detecting unit 1011, a parsing unit 1013 and a generating unit 1015. Configurations of the detecting unit 1011, the parsing unit 1013 and the generating unit 1015 are similar to configurations of the detecting unit 811, the parsing unit 813 and the generating unit 815 described above with reference to FIG. 8.

The transceiving apparatus 1020 is configured to transmit feedback information to the serving base station by a licensed frequency band. For example, the generating unit 1015 may generate PUCCH including the feedback information, and the transceiving apparatus 1020 may transmit the feedback information by a primary carrier. Alternatively, the generating unit 1015 may generate media access control (MAC) signaling including the feedback information, and the transceiving apparatus 1020 may transmit the signaling by a primary carrier. The MAC signaling is more suitable for a case where there are multiple candidate frequency bands.

Next, a wireless communication method for user equipment side according to an embodiment of the present disclosure is illustrated with reference to FIG. 11.

Figure 11:
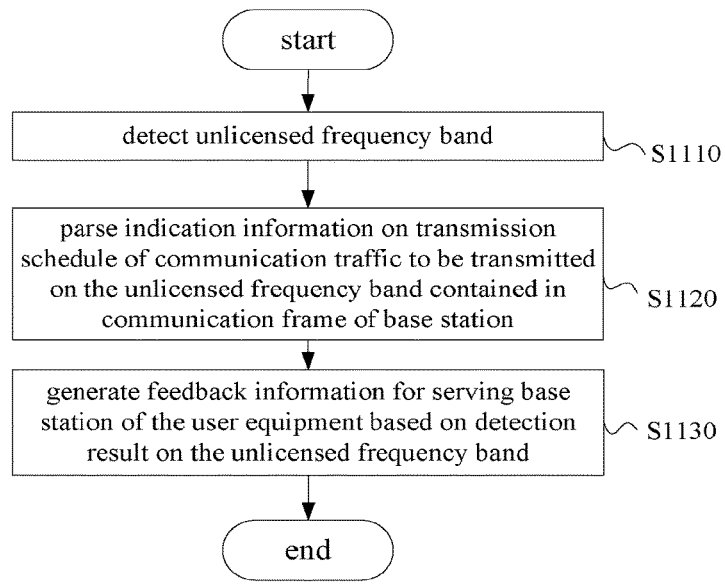
FIG. 11 is a flowchart showing a process example of a wireless communication method performed on user equipment side according to an embodiment of the present disclosure.

As shown in FIG. 11, a wireless communication method performed on user equipment side according to the embodiment includes:

S1110, detecting an unlicensed frequency band;

S1120, parsing indication information on a transmission schedule of communication traffic to be transmitted on the unlicensed frequency band included in a communication frame of a base station. The communication frame may be located in the unlicensed frequency band and the communication frame may further carry the communication traffic to be transmitted. Alternatively, the communication frame may be located in a licensed frequency band; and S1130, generating feedback information for a serving base station of the user equipment based on a detection result on the unlicensed frequency band.

Figure 15:
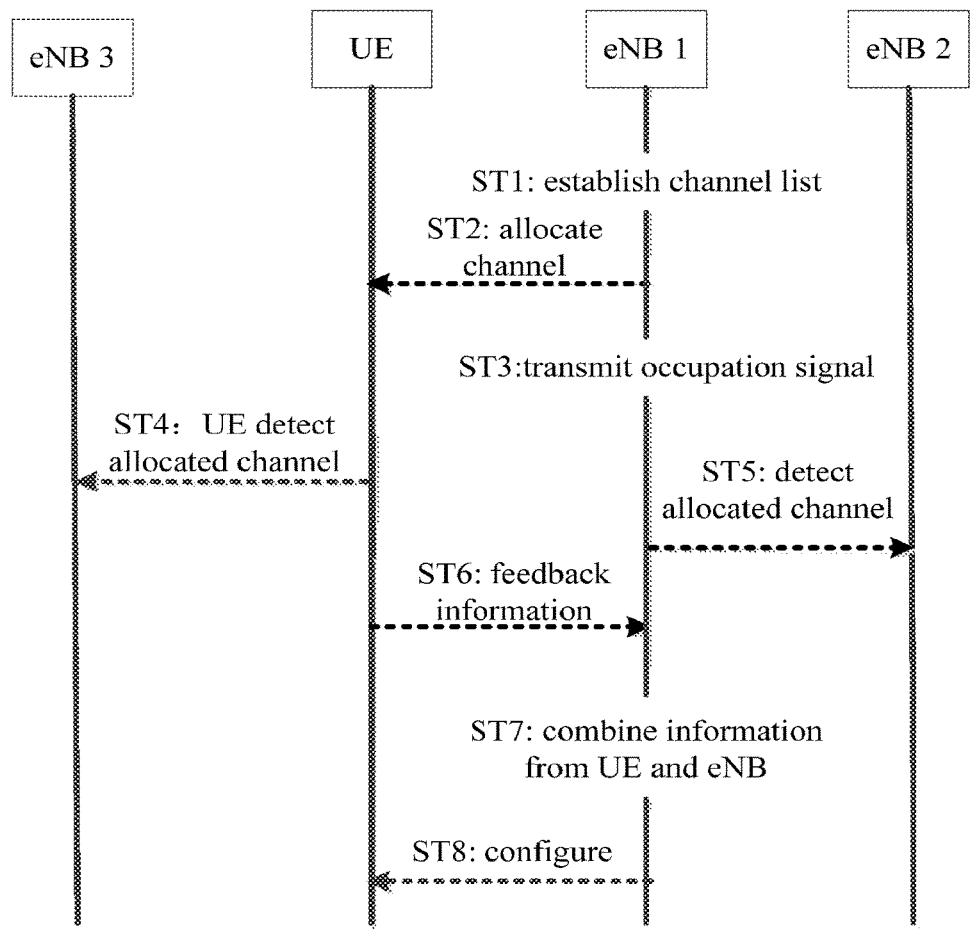
FIG. 15 is a schematic diagram of an exemplary process according to a specific embodiment.

Next, an exemplary process in which a base station and a user equipment jointly detect an unlicensed frequency band is illustrated with reference to FIG. 15. In FIG. 15, a base station eNB 1 is a serving base station of a user equipment UE.

In ST1, eNB 1 creates a list of available unlicensed frequency bands.

In ST2, eNB 1 notifies the UE of a target unlicensed frequency band.

Subsequently, in ST3, eNB 1 transmits an occupation signal on the target unlicensed frequency band to prevent other devices from accessing the frequency band.

In ST4 and ST5, the UE and eNB 1 detect whether the target unlicensed frequency band is used by another device respectively. It should be noted that, prior to ST1, the eNB1 may also perform corresponding detection process.

In ST6, the UE feeds back a detection result to eNB 1.

In ST7, eNB 1 determines an allocation of unlicensed frequency band based on the detection result from the UE in combination with a detection result obtained by eNB 1 itself, and performs a corresponding configuration in ST8 to use the unlicensed frequency band.

As an example, various steps of the above methods and various modules and/or units of the above devices may be implemented as software, firmware, hardware or a combination thereof. In a case of implementing by software or firmware, programs consisting of the software for implementing the methods above are installed to a computer with a dedicated hardware structure (for example a general-purpose computer 1200 shown in FIG. 12) from the storage medium or the network. The computer can perform various types of functions when installed with various types of programs.

Figure 12:
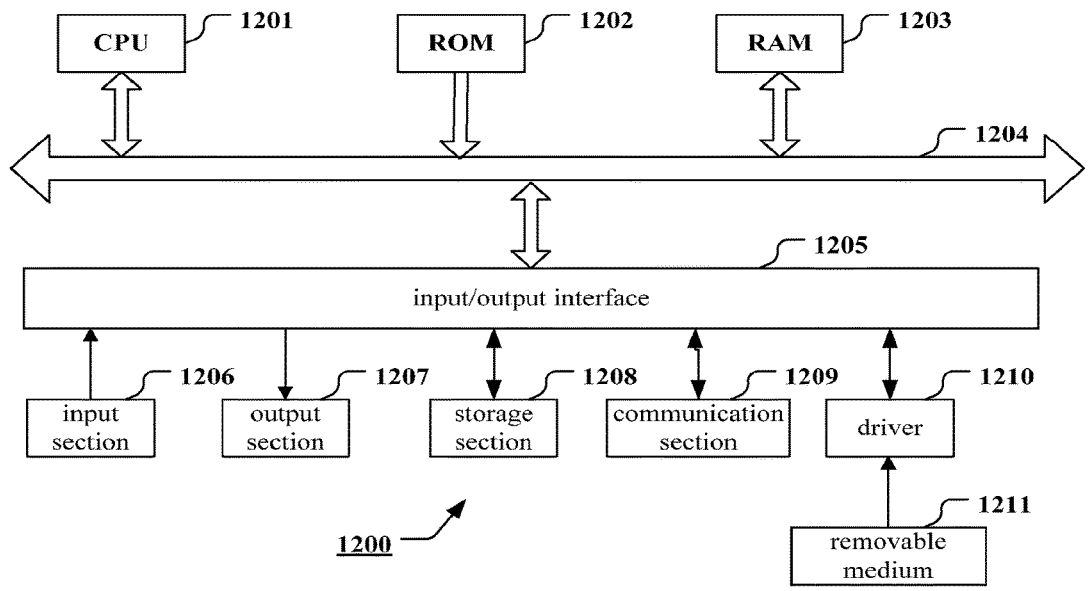
FIG. 12 is a block diagram of an exemplary structure of a computer for implementing the method and device according to the present disclosure.

In FIG. 12, a central processing unit (CPU) 1201 performs various types of processing according to programs stored in a read only memory (ROM) 1202 or programs loaded from a storage section 1208 to a random access memory (RANI) 1203. Data required when the CPU 1201 performs various types of processing is also stored in the RAM 1203 as needed. The CPU 1201, the ROM 1202 and the RAM 1203 are linked to each other via a bus 1204. An input/output interface 1205 is also linked to the bus 1204.

The following components are linked to the input/output interface 1205: an input section 1206 (including a keyboard, and a mouse and so on), an output section 1207 (including a display such as a cathode ray tube (CRT) and a liquid crystal display (LCD), and a loudspeaker), a storage section 1208 (including a hard disk and so on), and a communication section 1209 (including a network interface card for example a LAN card, and a modem). The communication section 1209 performs communication processing via a network for example the Internet. A driver 1210 may also be linked to the input/output interface 1205 as needed. A removable medium 1211 for example a magnetic disk, an optical disk, a magnetic-optical disk and a semiconductor memory may be installed on the driver 1210 as needed, such that computer programs read from the removable medium 1211 are installed on the storage section 1208 as needed.

In a case of performing the series of processing described above by software, programs consisting of the software are installed from the network for example the Internet or the storage medium for example the removable medium 1211.

Those skilled in the art should understand that the storage medium is not limited to the removable medium 1211 shown in FIG. 12 which stores programs and is distributed separately from the device to provide the programs to the user. Examples of the removable medium 1211 include: a magnetic disk (including a floppy disk (registered trademark), an optical disk (including a compact disk read only memory (CD-ROM) and a digital versatile disk (DVD), a magnetic-optical disk (including a mini disk (MD) (registered trademark)), and a semiconductor memory. Alternatively, the storage medium may be a hard disk included in the ROM 1202 and the storage section 1208 which stores programs. The storage medium and the device including the same are distributed together to the user.

A program product storing machine readable instruction codes is further provided according to the embodiments of the present disclosure. When read and executed by a machine, the instruction codes cause the machine to perform the method according to the embodiment of the present disclosure.

Accordingly, a storage medium for carrying the program product storing the machine readable instruction codes is also included in the present disclosure. The storage medium includes but not limited to a floppy disk, an optical disk, a magnetic-optical disk, a storage card and a memory stick and so on.

The embodiments of the present disclosure further relate to an electronic device as follow. In a case that the electronic device is used for base station side, the electronic device may be implemented as any type of evolved node B (eNB), such as a macro eNB and a small eNB. The small eNB may be an eNB covering a cell smaller than a macro cell, such as a pico eNB, a micro eNB and a home (femto) eNB. Alternatively, the electronic device may be implemented as any other type of base stations, such as a NodeB and a base transceiver station (BTS). The electronic device may include: a body configured to control wireless communication (also referred to as a base station device); and one or more remote radio heads (RRH) located at positions different from the body. In addition, various types of terminals described in the following each may function as a base station to operate by performing functions of the base station temporarily or in a semi-permanent manner.

In a case that the electronic device is for user equipment side, the electronic device may be implemented as a mobile terminal (such as a smart phone, a tablet personal computer (PC), a notebook PC, a portable game terminal, a portable/dongle mobile router and a digital camera) or a vehicle terminal (such as an automobile navigation device). In addition, the electronic device may be a wireless communication module installed on each of the above terminals (such as an integrated circuit module including one or more chips).

[Application Example on Terminal Device]

Figure 13:
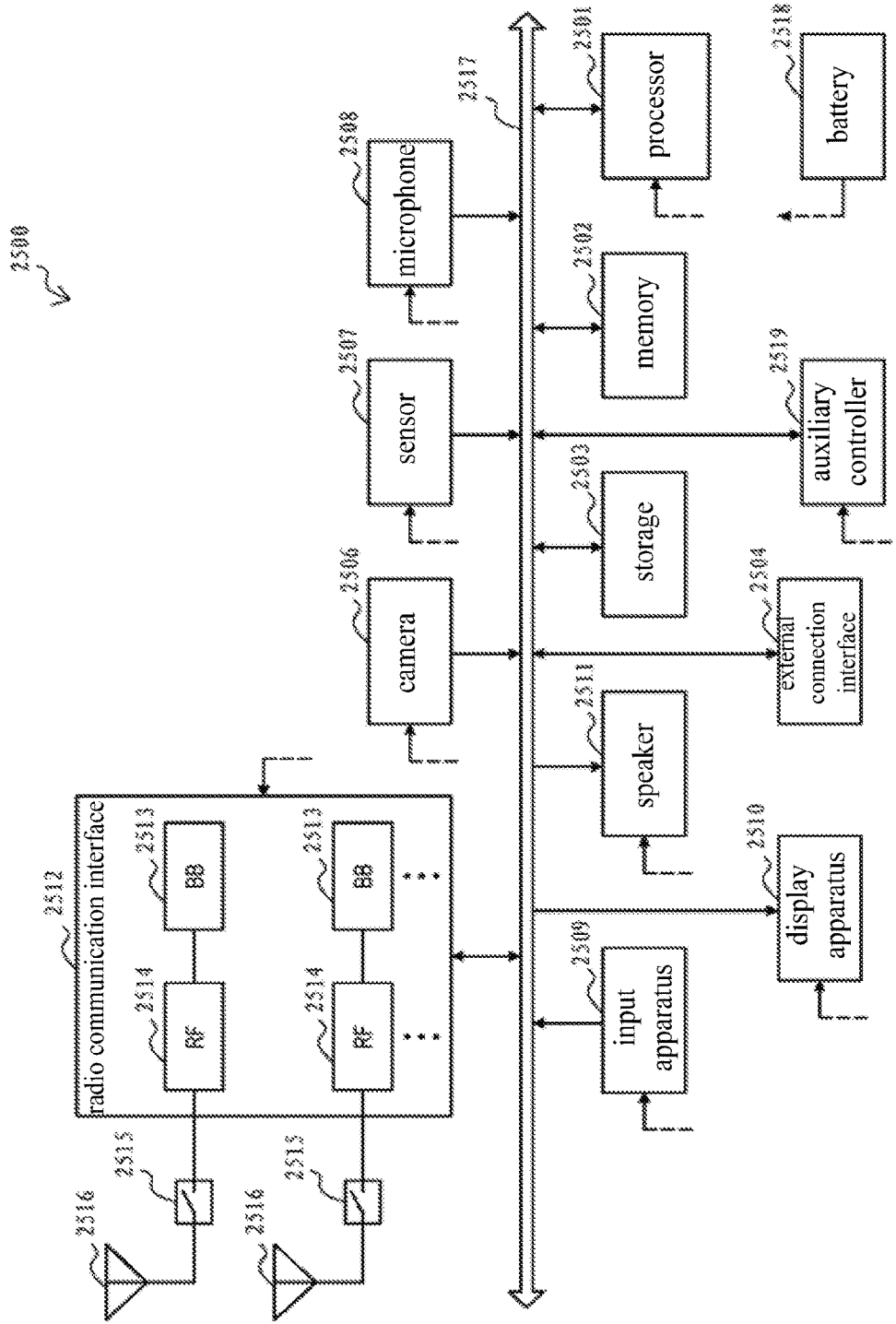
FIG. 13 is a block diagram of an example of a schematic configuration of a smart phone to which the technology of the present disclosure may be applied.

FIG. 13 is a block diagram illustrating an example of a schematic configuration of a smart phone 2500 to which the technology of the present disclosure may be applied. The smart phone 2500 includes a processor 2501, a memory 2502, a storage 2503, an external connection interface 2504, a camera 2506, a sensor 2507, a microphone 2508, an input apparatus 2509, a display apparatus 2510, a speaker 2511, a radio communication interface 2512, one or more antenna switches 2515, one or more antennas 2516, a bus 2517, a battery 2518, and an auxiliary controller 2519.

The processor 2501 may be, for example, a CPU or a system on a chip (SoC), and controls functions of an application layer and another layer of the smart phone 2500. The memory 2502 includes RAM and ROM, and stores a program that is executed by the processor 2501, and data. The storage 2503 may include a storage medium such as a semiconductor memory and a hard disk. The external connection interface 2504 is an interface for connecting an external apparatus such as a memory card and a universal serial bus (USB) apparatus to the smart phone 2500.

The camera 2506 includes an image sensor such as a charge coupled device (CCD) and a complementary metal oxide semiconductor (CMOS), and generates a captured image. The sensor 2507 may include a group of sensors such as a measurement sensor, a gyro sensor, a geomagnetic sensor, and an acceleration sensor. The microphone 2508 converts sounds that are input to the smart phone 2500 into audio signals. The input apparatus 2509 includes, for example, a touch sensor configured to detect touch on a screen of the display apparatus 2510, a keypad, a keyboard, a button, or a switch, and receive an operation or information input from a user. The display apparatus 2510 includes a screen such as a liquid crystal display (LCD) and an organic light-emitting diode (OLED) display, and displays an output image of the smart phone 2500. The speaker 2511 converts audio signals that are output from the smart phone 2500 into sounds.

The radio communication interface 2512 supports any cellular communication scheme such as LTE and LTE-Advanced, and performs radio communication. The radio communication interface 2512 may typically include, for example, a BB processor 2513 and an RF circuit 2514. The BB processor 2513 may perform, for example, encoding/decoding, modulating/demodulating, and multiplexing/demultiplexing, and performs various types of signal processing for radio communication. Meanwhile, the RF circuit 2514 may include, for example, a mixer, a filter, and an amplifier, and transmits and receives radio signals via the antenna 2516. The radio communication interface 2512 may be a chip module having the BB processor 2513 and the RF circuit 2514 integrated thereon. The radio communication interface 2512 may include multiple BB processors 2513 and multiple RF circuits 2514, as illustrated in FIG. 13. Although FIG. 13 illustrates the example in which the radio communication interface 2512 includes multiple BB processors 2513 and multiple RF circuits 2514, the radio communication interface 2512 may also include a single BB processor 2513 or a single RF circuit 2514.

Furthermore, in addition to a cellular communication scheme, the radio communication interface 2512 may support other types of radio communication scheme such as a short-distance radio communication scheme, a near field communication scheme, and a radio local area network (LAN) scheme. In this case, the radio communication interface 2512 may include the BB processor 2513 and the RF circuit 2514 for each radio communication scheme.

Each of the antenna switches 2515 switches connection destinations of the antennas 2516 among multiple circuits (such as circuits for different radio communication schemes) included in the radio communication interface 2512.

Each of the antennas 2516 includes a single or multiple antenna elements (such as multiple antenna elements included in an MIMO antenna), and is used for the radio communication interface 2512 to transmit and receive radio signals. The smart phone 2500 may include the multiple antennas 2516, as illustrated in FIG. 13. Although FIG. 13 illustrates the example in which the smart phone 2500 includes multiple antennas 2516, the smart phone 2500 may also include a single antenna 2516.

Furthermore, the smart phone 2500 may include the antenna 2516 for each radio communication scheme. In this case, the antenna switches 2515 may be omitted from the configuration of the smart phone 2500.

The bus 2517 connects the processor 2501, the memory 2502, the storage 2503, the external connection interface 2504, the camera 2506, the sensor 2507, the microphone 2508, the input apparatus 2509, the display apparatus 2510, the speaker 2511, the radio communication interface 2512, and the auxiliary controller 2519 to each other. The battery 2518 supplies power to blocks of the smart phone 2500 illustrated in FIG. 13 via feeder lines, which are partially shown as dashed lines in the figure. The auxiliary controller 2519 operates a minimum necessary function of the smart phone 2500, for example, in a sleep mode.

In the smart phone 2500 shown in FIG. 13, the transceiving apparatus 1020 described with reference to FIG. 10 may be implemented by using the radio communication interface 2512. At least a part of functions of units described with reference to FIG. 8 to FIG. 10 may also be implemented by a processor 2501 or an auxiliary controller 2519. For example, power consumption of the battery 2518 may be reduced by performing a part of the functions of the processor 2501 by the auxiliary controller 2519. In addition, the processor 2501 or the auxiliary controller 2519 may perform at least a part of the functions of the units described with reference to FIG. 8 to FIG. 10 by executing programs stored in the memory 2502 or the storage 2503.

[Application Example on a Base Station]

Figure 16:
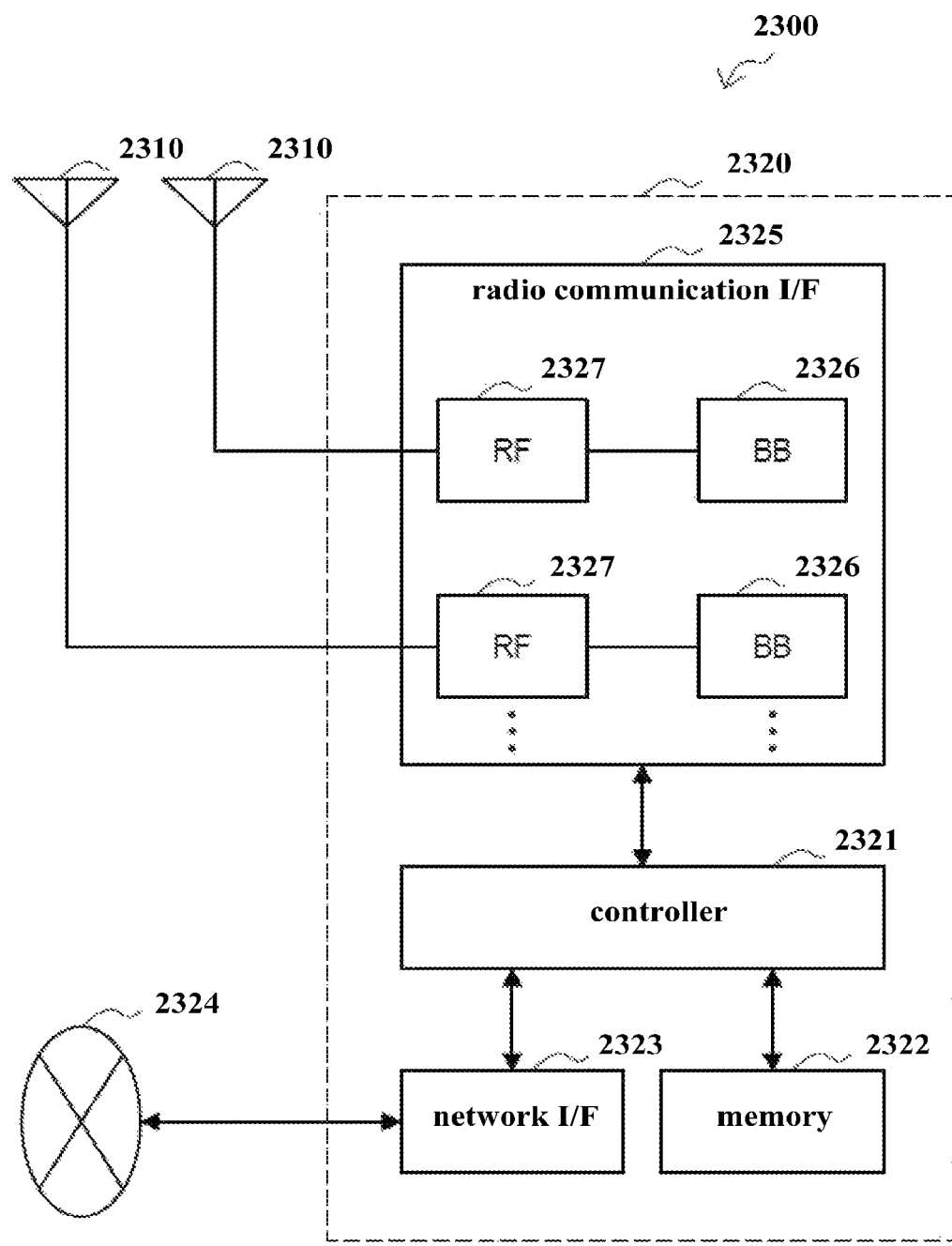
FIG. 16 is a block diagram of a schematic configuration of an evolutional NodeB (eNB) to which the technology of the present disclosure may be applied.

FIG. 16 is a block diagram of an example of a schematic configuration of an eNB to which the technology of the present disclosure may be applied. An eNB 2300 includes one or more antennas 2310 and a base station device 2320. The base station device 2320 and each antenna 2310 may be connected to each other via a radio frequency (RF) cable.

Each of the antennas 2310 includes one or more antenna elements (such as multiple antenna elements included in a multiple input multiple output (MIMO) antenna) and is used by the base station device 2320 to transmit and receive a radio signal. As shown in FIG. 16, the eNB 2300 may include multiple antennas 2310. For example, the multiple antennas 2310 may be compatible with multiple frequency bands used by the eNB 2300. Although FIG. 16 shows an example in which the eNB2300 includes multiple antennas 2310, the eNB2300 may include a single antenna 2310.

The base station device 2320 includes a controller 2321, a memory 2322, a network interface 2323 and a radio communication interface 2325.

The controller 2321 may be a CPU or a DSP and control various functions of higher layers of the base station device 2320. For example, the controller 2321 generates a data packet based on data in a signal processed by the radio communication interface 2325, and transfers the generated packet via a network interface 2323. The controller 2321 may bind data from multiple baseband processors to generate a binding packet and transfer the generated binding packet. The controller 2321 may have logic functions for performing the following control: radio resource control, radio carrying control, mobility management, admission control and schedule. The control may be performed in combination with an adjacent eNB or a core network node. The memory 2322 includes RAM and ROM, and stores programs executed by the controller 2321 and various types of control data (such as a terminal list, transmission power data and scheduling data).

The network interface 2323 is configured to connect the base station device 2320 to a communication interface of the core network 2324. The controller 2321 may communication with the core network node or another eNB via the network interface 2323. In this case, the eNB 2300 and the core network node or another eNB may be connected to each other via a logic interface (such as an S1 interface or an X2 interface). The network interface 2323 may be a wired communication interface or a radio communication interface for a wireless backhaul line. If the network interface 2323 is a radio communication interface, the network interface 2323 may use a higher frequency band for wireless communication as compared with the frequency band used by the radio communication interface 2325.

The radio communication interface 2325 supports any cellular communication scheme (such as long term evolution (LTE) and LTE-advanced), and provides a radio connection to a terminal located in a cell of the eNB 2300 via an antenna 2310. The radio communication interface 2325 may generally include a baseband (BB) processor 2326 and an RF circuit 2327. The BB processor 2326 may perform for example encoding/decoding, modulating/demodulating and multiplexing/demultiplexing, and various types of signal processing of layers (such as L1, medium access control (MAC), radio link control (RLC) and packet data convergence protocol (PDCP)). Instead of the controller 2321, the BB processor 2326 may have a part or all of the above logic functions. The BB processor 2326 may be a memory storing communication control programs or a module including a processor configured to execute programs and a related circuit. Updating programs may change functions of the BB processor 2326. The module may be a card or a blade inserted into a slot of the base station device 2320. Alternatively, the module may be a chip installed on the card or the blade. Meanwhile, the RF circuit 2327 may include for example a mixer, a filter or an amplifier, and transmits and receives a radio signal via the antenna 2310.

As shown in FIG. 16, the radio communication interface 2325 may include multiple BB processors 2326. For example, the multiple BB processors 2326 may be compatible with multiple frequency bands used by the eNB 2300. As shown in FIG. 16, the radio communication interface 2325 may include multiple RF circuits 2327. For example, the multiple RF circuits 2327 may be compatible with multiple antenna elements. Although FIG. 16 shows an example in which the radio communication interface 2325 includes multiple BB processors 2326 and multiple RF circuits 2327, the radio communication interface 2325 may include a single BB processor 2326 or a single RF circuit 2327.

In the eNB 2300 shown in FIG. 16, the transceiving device 220 to the transceiving device 620 described with reference to FIG. 2 to FIG. 6 may be implemented by using the radio communication interface 2325. At least a part of the functions of units described with reference to FIG. 1 to FIG. 6 may be implemented by the controller 2321. For example, the controller 2321 may perform at least a part of the functions of the units described with reference to FIG. 1 to FIG. 6 by performing the programs stored in the memory 2322.

In the description of specific embodiments of the present disclosure above, features described and/or illustrated for one embodiment may be used in one or more other embodiments in the same or similar manner, combined with features in other embodiments, or substitute for features in other embodiments.

It should be noted that, terms "including/comprising" used herein refer to existing of features, elements, steps or components, but existing or adding of one or more other features, elements, steps or components is not excluded.

In the above embodiments and examples, reference numerals consisting of numbers are used to indicate various steps and/or units. Those skilled in the art should understand that the reference numerals are used to facilitate describing and drawing, and are not intended to indicate an order or limit in any way.

In addition, the method according to the present disclosure is not limited to be performed in a time order described in the description, and may be performed according to other time orders, in parallel or independently. Therefore, the order in which the method described in the description is performed does not limit the technical scope of the present disclosure.

Although the present disclosure is disclosed by the description of specific embodiments of the present disclosure above, it should be understood that all the embodiments and examples described above are only schematic and are not intended to limit. For those skilled in the art, various changes, improvements or equivalents may be designed for the present disclosure within the spirit and scope of the appended claims. The changes, improvements or equivalents should be regarded as falling within the protection scope of the present disclosure.

The invention claimed is:

1. A wireless communication device, comprising:
a memory holding instructions;
at least one processor configured to execute the instructions held in the memory to
determine transmission time information of communication traffic to be transmitted on a target unlicensed frequency band; and
generate indication information indicating the transmission time information, wherein the indication information includes an indication of an amount of time needed to transmit a remaining amount of the communication traffic, wherein
the at least one processor is further configured to embed the indication information into a broadcast subframe for coordination with another communication device.

2. The wireless communication device according to claim 1, wherein the at least one processor is further configured to add the indication information into a communication frame located in the target unlicensed frequency band.

3. The wireless communication device according to claim 2, wherein the broadcast subframe is a public channel subframe, and the at least one processor is further configured to embed a physical cell identifier of the base station in the public channel subframe for coordination with the other communication device.

4. The wireless communication device according to claim 3, wherein the broadcast subframe is a multicast broadcast single frequency network subframe.

5. The wireless communication device according to claim 1, wherein
the at least one processor is further configured to detect an unlicensed frequency band, and estimate an available unlicensed frequency band based on a detection result and to select at least one candidate frequency band for a user equipment, and
the wireless communication device further comprises a transceiving apparatus configured to notify the user equipment of the at least one candidate frequency band.

6. The wireless communication device according to claim 5, wherein the transceiving apparatus is further configured to transmit an occupation signal on the candidate frequency band within a predetermined period after notifying the user equipment of the candidate frequency band.

7. The wireless communication device according to claim 6, wherein the occupation signal is a cell-specific reference signal.

8. The wireless communication device according to claim 5, wherein the transceiving apparatus is further configured to receive a detection result of the user equipment on the candidate frequency band, and the at least one processor is further configured to determine, based on at least the detection result of the user equipment on the candidate frequency band, the target unlicensed frequency band to be allocated to the user equipment.

9. The wireless communication device according to claim 5, wherein the at least one processor is further configured to estimate available time of a corresponding unlicensed frequency band based on the indication information in a detected signal from another base station.

10. The wireless communication device according to claim 5, wherein the at least one processor is further configured to, in a case that a signal in the unlicensed frequency band is detected from another base station of a same system, coordinate with the other base station on usage of the unlicensed frequency band.

11. The wireless communication device according to claim 5, wherein the at least one processor is further configured to trigger a sensing on the unlicensed frequency band based on at least one of a request from the user equipment and a quality of communication performed with the user equipment on a licensed frequency band.

12. The wireless communication device according to claim 1, wherein the at least one processor is further configured to send the indication information to a user equipment.

13. The wireless communication device according to claim 1, wherein the transmission time information comprises start transmission time and end transmission time of the communication traffic to be transmitted in the target unlicensed band.

14. The wireless communication device of claim 1, wherein
the indication of the amount of time is described as an indication of a number of frames needed to transmit the remaining amount of the communication traffic.

15. A wireless communication device, comprising:
a memory holding instructions;
at least one processor configured to execute the instructions held in the memory to
receive an indication information from base station, the indication information indicating a transmission time of a transmission to be transmitted on an unlicensed frequency band, the indication information being embedded into a broadcast subframe for coordination with another communication device;
determine an availability of the unlicensed frequency band; and
perform the transmission on the unlicensed frequency band within the transmission time if the unlicensed frequency band is available, wherein the indication information includes an indication of an amount of time needed to transmit a remaining amount of the communication traffic.

16. The wireless communication device of claim 15, wherein the transmission time comprises a transmission end time indicated by a remaining time of the transmission time.

* * * * *